Figure 1:
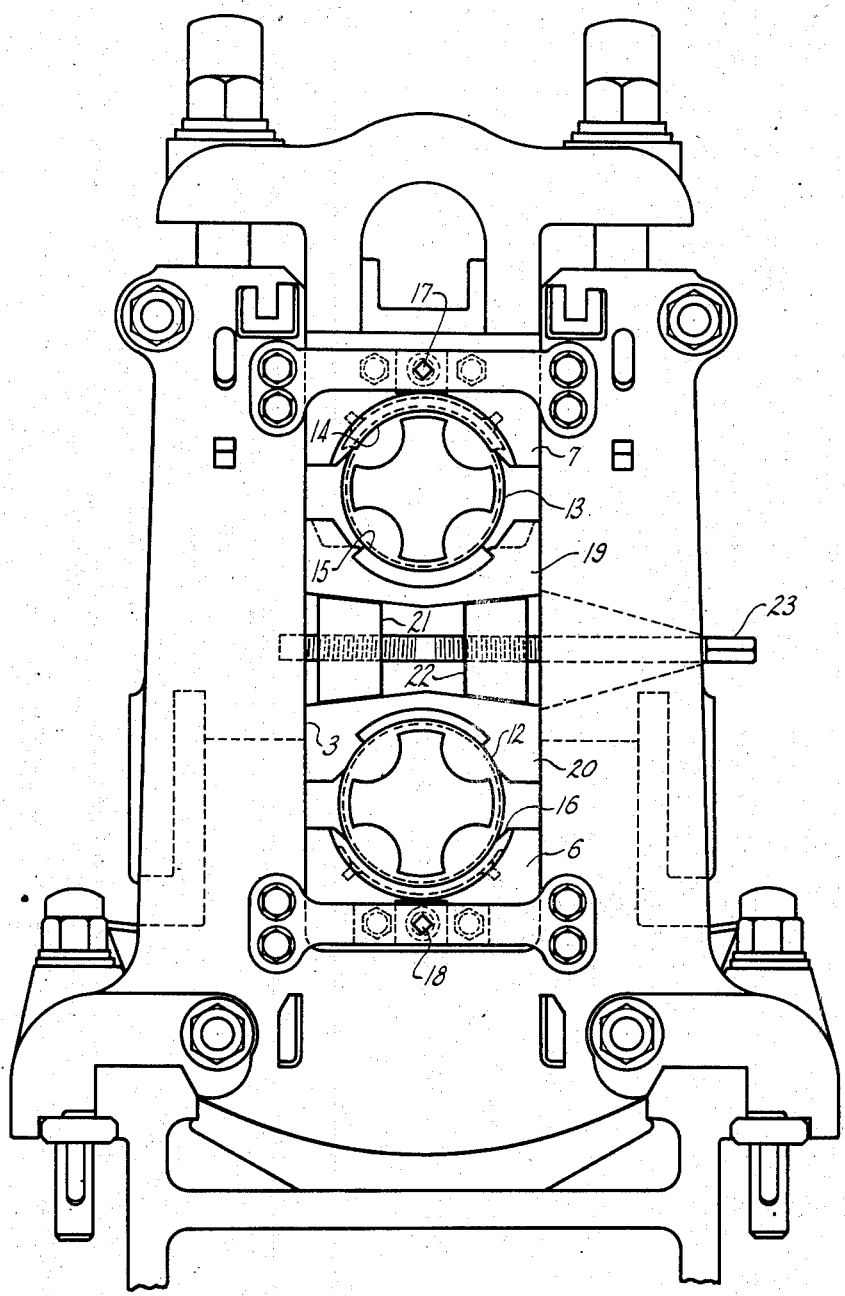

Patented Nov. 28, 1944

2,363,656

UNITED STATES PATENT OFFICE 2,363,656

CORRUGATED NECK ROLL

Walter R. Dawson, Portland, Oreg.

Application May 12, 1942, Serial No. 442,580

4 Claims. (Cl. 80—56)

This invention relates to new and useful improvements in roll necks and bearings, particularly adapted to rolling mill practice, and it is among the objects thereof to provide a roll neck and bearing design adapted to resist transverse and end pressures exerted by the rolls in their rolling function.

It is another object of the invention to provide a roll neck and bearing design which shall have an initial lower cost of bearing construction and which shall greatly prolong the wearing life of such necks and bearings.

It is another object of the invention to provide a combined neck and bearing design that shall insure smooth precision rolling and greatly improve the accuracy of the product, particularly where such product is rolled to precision shapes or forms.

Figure 2:
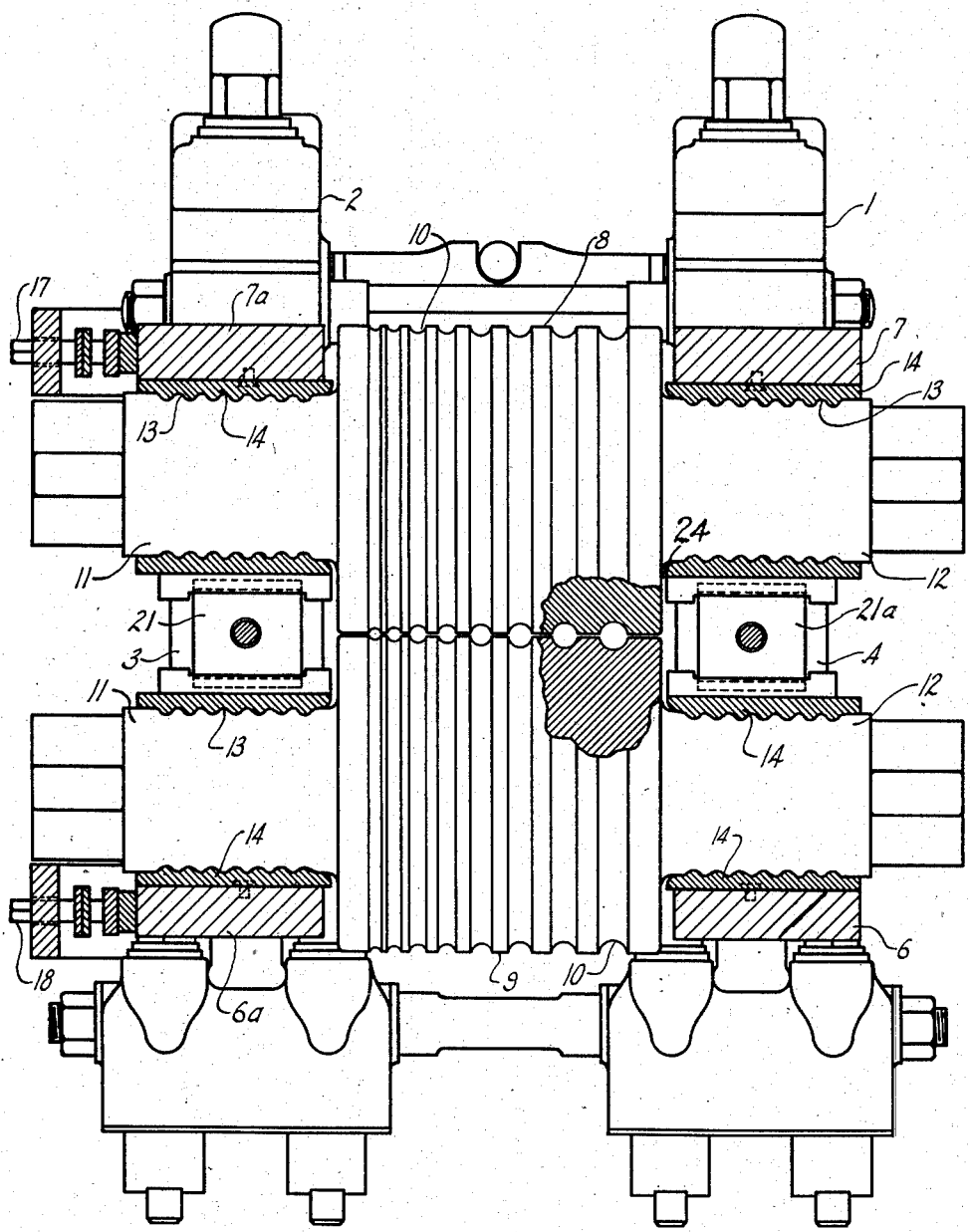

These and other objects of the invention will become more apparent from a consideration of the accompanying drawings constituting a part hereof, in which like reference characters designate like parts and in which:

Fig. 1 is an end elevational view of a rolling mill stand embodying the principles of this invention; and Fig. 2 a front elevational view thereof, partially in cross-section.

With particular reference to Fig. 2 of the drawings, the structure therein illustrated comprises a pair of roll stands 1 and 2 having the usual windows 3 and 4 for receiving the bearings generally designated by the numerals 6, 6a and 7, 7a.

The numerals 8 and 9 designate the rolls which, as shown, are provided with semi-cylindrical grooves 10 of gradually diminishing diameter, suitable for rolling rounds. The shapes shown are for illustration only as any rollable shapes may be employed for rolling any rollable materials including metal.

Rolls 8 and 9 are each provided with corrugated journal necks 11 and 12, the grooves or corrugations of which are of symmetrical form which cooperate or interact with complementary shaped corrugations or grooves 13 of the bearing composition 14, the composition 14 being mounted on the bearing blocks 7 and 6, respectively, which are provided with the lateral adjusting mechanisms 17 and 18, Figs. 1 and 2.

Separators, generally designated by the numerals 19 and 20, having wedge blocks 21 and 22 movable towards and away from each other by a left and a right hand threaded screw shaft 23, are interposed between the lower bearings of the upper roll and the top bearing of the lower roll to firmly hold them in place. By rotating the screw 23, the separators are adjustable to tighten the bearing blocks.

It is to be noted from Fig. 2 of the drawings that there is a clearance space 24 between the end of the rolls and the bearings which is essential to avoid the generation of heat that would result by contact of these elements.

The operating characteristics of the above-described rolls, roll necks and bearings is briefly as follows:

The grooved journal necks and bearings provide a much greater bearing area than a straight-faced or plain bearing surface, thereby reducing friction that would result from the concentration of pressure on a relatively smaller area, with a resultant reduction in heat.

Also, the grooved journal necks and bearings constitute end thrust stabilizers that eliminate end or thrust bearings and maintain accuracy of alignment of the roll passes. The rounded corrugations of the journal necks and bearings prevent wedging, which would result if V-shaped bearing faces were employed, and permit great accuracy of alignment of the necks and bearings.

It is apparent that only one of the journal necks of each roll need be equipped with the corrugated bearings for ordinary rolling mill use. Where, however, extreme rolling pressures and difficult shapes are encountered, both journal necks of each roll may be journalled in corrugated bearings or one roll may have one corrugated bearing and another roll two.

Another feature of the corrugated journal necks and bearings is that it permits expansion and contraction of molecular structure, thereby reducing fire-cracking of the journal necks. The bearings do not require an open end housing and coupling boxes do not interfere with their installation. They may be therefore applied to any rolling mill structure, and once the corrugated assembly is adjusted it maintains alignment of the bearings and rolls.

In steel mill application, the corrugated journals may be used on blooming mill rolls, roughing rolls, intermediate rolls and finishing rolls, but their application is most useful where close tolerances are important.

It will be evident from the foregoing description of the invention that corrugated journal rolls made in accordance therewith obviate largely the difficulties prevalent in the use of plain journal necks and bearings, while eliminating end thrust and heat and thereby dispensing with auxiliary cooling equipment now largely in use.

Although one embodiment of the invention has been herein illustrated and described, it will be evident to those skilled in the art that various modifications may be made in the details of construction without departing from the principles herein set forth.

I claim:

1. A journal bearing for rolling mills comprising a journal neck having a plurality of semi-circular grooves and semi-circular projections forming a corrugated bearing surface, an upper bearing block having a bearing for said journal neck, a bottom bearing block having a bearing for said journal neck, said bearings having complementary shaped bearing surface interacting with the bearing surface of said journal neck, and means for adjusting the upper bearing block laterally relative to the neck and the lower bearing block radially relative to the journal neck.

2. In a rolling mill structure, a plurality of forming rolls mounted between bearing supporting uprights and having their roll necks journalled therein, one or more of said roll necks having a corrugated surface of relatively shallow depth constituting substantially the entire bearing surface of said journal for uniformly distributing the rolling thrust axially and radially thereon, said uprights having bearing plates the bearing faces of which are complementary in shape with the bearing faces of said roll necks, means for adjusting some of said bearing plates axially of said rolls and means for adjusting others of said bearing plates radially of said rolls.

3. In a rolling mill structure, a plurality of forming rolls mounted between supporting uprights having journal necks extending into said uprights, bearing plates in said uprights for engaging said journal necks, the bearing faces of some of said journals and plates being complementary shaped to provide a bearing surface of substantially greater length than the axis of the journal bearings and for uniformly distributing the axial and radial rolling thrust load over substantially the entire bearing surface of the journal necks, means for adjusting some of the complementary shaped bearing plates axially of said journal necks and means for adjusting others of said complementary shaped bearing plates radially of said journal necks.

4. In a rolling mill, a plurality of rolls journaled to form a roll pass, said rolls having corrugated journal necks of semi-circular grooves and semi-circular projections, bearing blocks for said journal necks shaped complementary to the corrugations of said journal necks, and wedge blocks simultaneously movable to adjust the bearing blocks intermediate the roll necks radially to the journal necks to thereby adjust the relative positions of the supporting bearing surfaces.

WALTER R. DAWSON.